US012388339B2

(12) United States Patent
Shi et al.

(10) Patent No.: US 12,388,339 B2
(45) Date of Patent: Aug. 12, 2025

(54) DIRECT DRIVE MOTOR

(71) Applicant: AAC Technologies (Nanjing) Co., Ltd., Nanjing (CN)

(72) Inventors: Weiling Shi, Nanjing (CN); Shun Guo, Nanjing (CN); Wanlun Wang, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 286 days.

(21) Appl. No.: 18/338,370

(22) Filed: Jun. 21, 2023

(65) Prior Publication Data

US 2024/0213870 A1 Jun. 27, 2024

Related U.S. Application Data

(63) Continuation of application No. PCT/CN2023/086473, filed on Apr. 6, 2023.

(30) Foreign Application Priority Data

Dec. 21, 2022 (CN) .......................... 202223450345.6

(51) Int. Cl.
*H02K 41/03* (2006.01)
*H02K 11/21* (2016.01)
(52) U.S. Cl.
CPC ........... *H02K 41/031* (2013.01); *H02K 11/21* (2016.01)

(58) Field of Classification Search
CPC ............................ H02K 41/031; H02K 11/21
See application file for complete search history.

(56) References Cited

U.S. PATENT DOCUMENTS

2011/0025136 A1* 2/2011 Chao .................... H02K 41/03
310/12.02

FOREIGN PATENT DOCUMENTS

CN      112187009 A  *  1/2021  ............... H02K 1/18
GB         2247787 A  *  3/1992  ........... H02K 41/031
WO  WO-2022047888 A1  *  3/2022

* cited by examiner

*Primary Examiner* — Mohamad A Musleh
(74) *Attorney, Agent, or Firm* — Wiersch Law Group

(57) ABSTRACT

The disclosure provides a direct drive motor, including: a primary assembly, the primary assembly including a slide, a coil assembly fixed to the slide, and two first end covers respectively fixed to the slide; and a secondary assembly, the secondary assembly including a base arranged opposite to the slide, a yoke fixed to the base, a magnet assembly fixed to the yoke, and two second end covers respectively fixed to two opposite circumferential sides of the base. The slide is slidably supported on the base. A side of each of the second end covers close to the yoke is provided with a mounting groove recessed in a direction away from the yoke, and two opposite ends of the yoke are respectively inserted and fixed in the mounting grooves of the two second end covers.

10 Claims, 4 Drawing Sheets

DIRECT DRIVE MOTOR

TECHNICAL FIELD

The disclosure relates to the technical field of motors, and in particular, to a direct drive motor.

BACKGROUND

A direct drive motor is a motor structure in which a two-part assembly forms a slidable support and can perform linear motion under generated thrust, mainly including a primary assembly and a secondary assembly.

The primary assembly mainly includes a slide and a coil assembly fixed to the slide. The secondary assembly mainly includes a base slidably supported on the slide, a yoke fixed to a side of the base close to the slide, a magnet assembly fixed to a side of the yoke close to the slide and arranged opposite to and apart from the coil assembly, and two end covers respectively fixed to two opposite circumferential sides of the base.

A principle of the direct drive motor is as follows. An air gap magnetic field is generated between the coil assembly and the magnet assembly. The magnet assembly can sense a magnetic field. When a current is applied to the coil assembly, the coil assembly may generate a traveling wave magnetic field, so that thrust is generated between the coil assembly and the magnet assembly to drive one of the primary assembly and the secondary assembly to perform linear motion while the other is fixed.

In the secondary assembly of the existing direct drive motor, side surfaces of the yoke close to the two end covers both are flush with the corresponding end covers or keep a certain mounting distance. This structure makes a distance between the two end covers longer when the yoke is of a same size. As a result, the entire direct drive motor occupies a larger space and cannot meet application scenarios with a limited space.

SUMMARY

The technical problem to be solved in the disclosure is how to provide a direct drive motor that has a compact structure and meets application scenarios with a limited space.

In order to solve the above technical problem, the disclosure provides a direct drive motor, including:
  a primary assembly, the primary assembly including a slide, a coil assembly fixed to the slide, and two first end covers respectively fixed to two opposite circumferential sides of the slide; and
  a secondary assembly, the secondary assembly including a base arranged opposite to the slide, a yoke fixed to a side of the base close to the slide, a magnet assembly fixed to a side of the yoke close to the slide, and two second end covers respectively fixed to two opposite circumferential sides of the base, the slide being slidably supported on the base; the magnet assembly being arranged opposite to and apart from the coil assembly to interact to generate a driving force, the two second end covers being respectively arranged opposite to and apart from the two first end covers;
  wherein a side of each of the second end covers close to the yoke is provided with a mounting groove recessed in a direction away from the yoke, and two opposite ends of the yoke are respectively inserted and fixed in the mounting grooves of the two second end covers.

As an improvement, an orthographic projection of each of the mounting grooves to the corresponding first end cover is at least partially located on the first end cover; and an orthographic projection of the magnet assembly to the primary assembly is at least partially within a range of the first end cover.

As an improvement, the mounting groove has a rectangular structure.

As an improvement, a groove depth of each of the mounting grooves along a direction from being close to the first end cover to being away from the first end cover is equal to or greater than a sum of thicknesses of the yoke and the magnet assembly.

As an improvement, the coil assembly includes an iron core fixed to a side of the slide close to the base and a plurality of coils respectively wound around the iron core.

As an improvement, the iron core includes a flat plate portion fixed to the side of the slide close to the base and a plurality of extension portions formed by protruding from a side of the flat plate portion close to the base toward the base and spaced apart; and one of the coils is wound around each of the extension portions.

As an improvement, the primary assembly further includes two first guide rails respectively fixed to two opposite ends of the slide; and the secondary assembly further includes two second guide rails respectively fixed to two opposite ends of the base; the two first guide rails being respectively supported on the two second guide rails and forming a slidable connection.

As an improvement, two opposite circumferential sides of each of the first guide rails form fixed connections with the two first end covers respectively; each of the second guide rails includes a first sliding block and a second sliding block fixed apart to the side of the base close to the slide; and the first guide rail is supported on the corresponding second sliding block and the corresponding first sliding block and forms the slidable connection.

As an improvement, the direct drive motor further includes a first position feedback unit and a second position feedback unit arranged oppositely and apart; one of the first position feedback unit and the second position feedback unit being fixed to a side of the slide close to the base, the other being fixed to the side of the base close to the slide, the second position feedback unit being configured to read position information of the first position feedback unit.

As an improvement, the first position feedback unit is a linear encoder fixed to the side of the slide close to the base; and the second position feedback unit is a linear encoder read head fixed to the side of the base close to the slide.

Compared with the related art, in the direct drive motor of the disclosure, a side of the second end cover close to the yoke is provided with a mounting groove recessed in a direction away from the yoke, and two opposite ends of the yoke are respectively inserted and fixed in the mounting grooves of the two second end covers. In this way, a distance between the two second end covers can be closer when the yoke is of a same size, so that the direct drive motor has a more compact structure size and can meet application scenarios with a limited space.

BRIEF DESCRIPTION OF DRAWINGS

In order to more clearly illustrate the technical solutions in the embodiments of the disclosure, the accompanying drawings used in the description of the embodiments will be briefly introduced below. It is apparent that, the accompanying drawings in the following description are only some embodiments of the disclosure, and other drawings can be obtained by those of ordinary skill in the art from the provided drawings without creative efforts.

Figure 1:
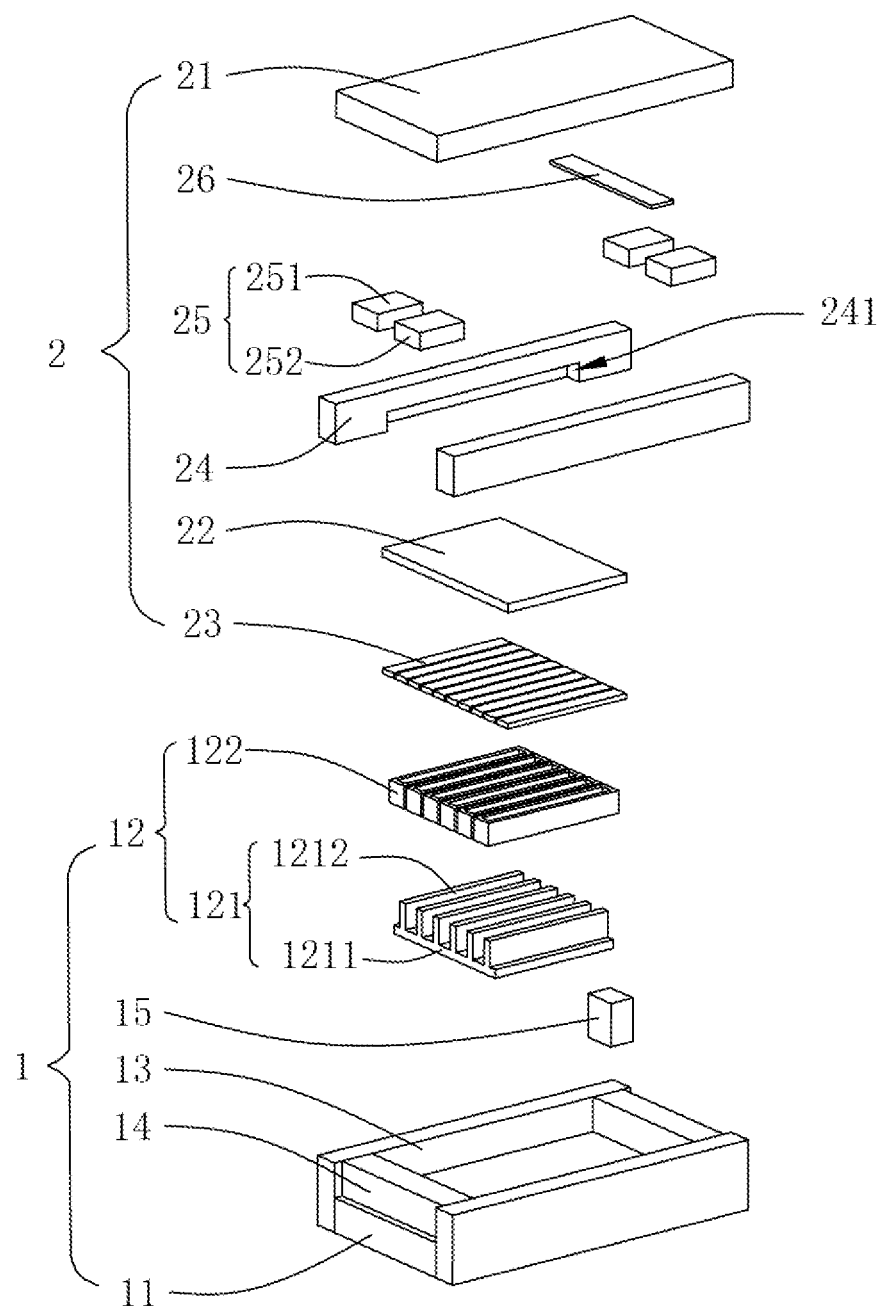
FIG. 1 is a schematic diagram of an exploded structure of a direct drive motor according to an embodiment of the disclosure.

In the drawings, 100: direct drive motor; 1: primary assembly; 11: slide; 12: coil assembly; 121: iron core; 1211: flat plate portion; 1212: extension portion; 122: coil; 13: first end cover; 14: first guide rail; 15: scale; 2: secondary assembly; 21: base; 22: yoke; 23: magnet; 24: second end cover; 241: mounting groove; 25: second guide rail; 251: first sliding block; 252: second sliding block; 26: linear encoder read head.

DESCRIPTION OF EMBODIMENTS

The technical solutions in the embodiments of the disclosure will be clearly and completely described below with reference to the accompanying drawings in the embodiments of the disclosure. Obviously, the described embodiments are only part of instead of all of the embodiments of the disclosure. Based on the embodiments in the disclosure, all other embodiments obtained by those of ordinary skill in the art without creative efforts fall within the protection scope of the disclosure.

Figure 2:
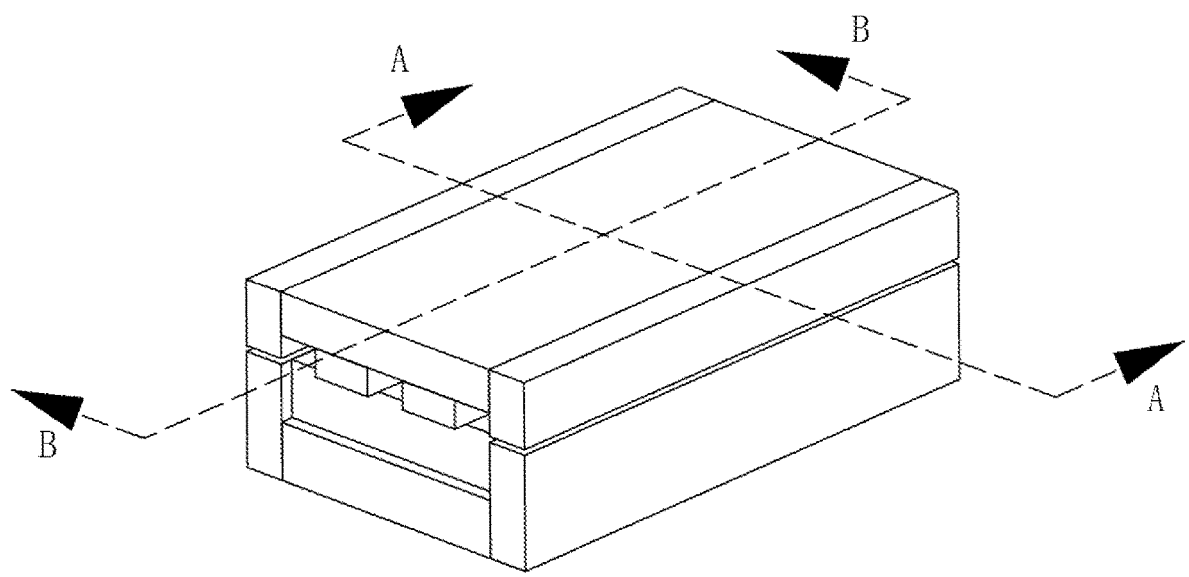
FIG. 2 is a schematic diagram of a three-dimensional structure of the direct drive motor according to an embodiment of the disclosure.
Figure 3:
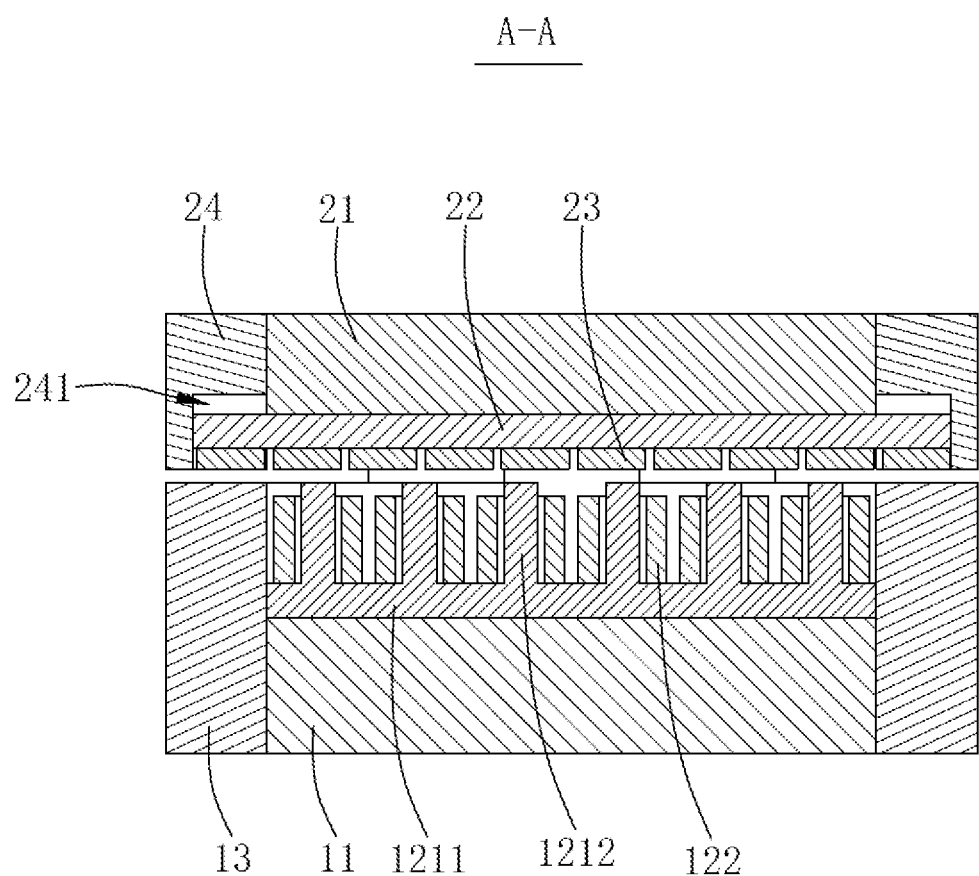
FIG. 3 is a sectional view taken along a line A-A in FIG. 2.
Figure 4:
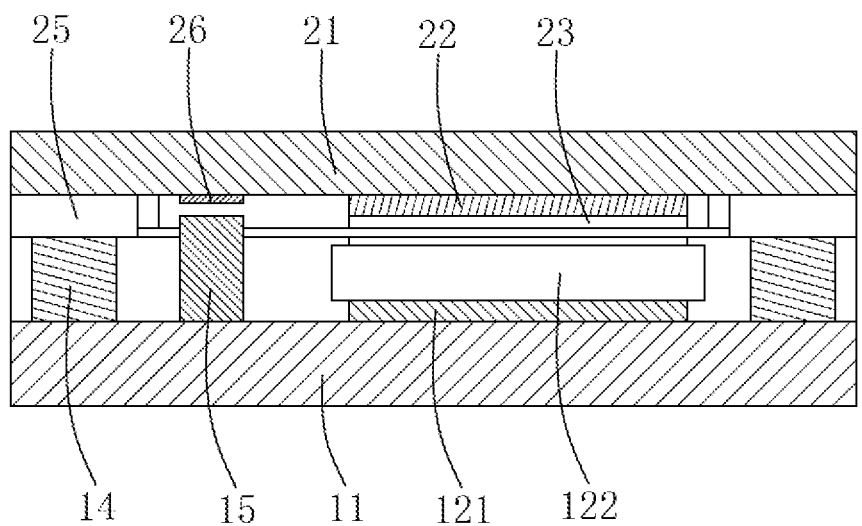
FIG. 4 is a sectional view taken along a line B-B in FIG. 2.

Referring to FIG. 1 to FIG. 4, an embodiment of the disclosure provides a direct drive motor 100, including a primary assembly 1 and a secondary assembly 2.

Specifically, the primary assembly 1 includes a slide 11, a coil assembly 12 fixed to the slide 11, and two first end covers 13 respectively fixed to two opposite circumferential sides of the slide 11.

Specifically, the secondary assembly 2 includes a base 21 arranged opposite to the slide 11, a yoke 22 fixed to a side of the base 21 close to the slide 11, a magnet assembly fixed to a side of the yoke 22 close to the slide 11, and two second end covers 24 respectively fixed to two opposite circumferential sides of the base 21. The slide 11 is slidably supported on the base 21. The magnet assembly is arranged opposite to and apart from the coil assembly 12 to interact to generate a driving force. The two second end covers 24 are respectively arranged opposite to and apart from the two first end covers 13.

A side of the second end cover 24 close to the yoke 22 is provided with a mounting groove 241 recessed in a direction away from the yoke 22, and two opposite ends of the yoke 22 are respectively inserted and fixed in the mounting grooves 241 of the two second end covers 24.

In this embodiment, the magnet assembly includes a plurality of magnets 23 fixed apart to a side of the yoke 22 close to the slide.

In this embodiment, an orthographic projection of each mounting groove 241 to the corresponding first end cover 13 is at least partially located on the first end cover 13. An orthographic projection of the magnet assembly to the primary assembly 1 is at least partially within a range of the first end cover 13. In this way, a distance between the two second end covers 24 can be closer, and a mounting area of the magnet assembly can also be increased.

In this embodiment, the mounting groove 241 has a rectangular structure. This design can facilitate mounting of the two opposite ends of the yoke 22 in the mounting grooves 241 of the two second end covers 24. Certainly, according to an actual requirement, the mounting groove 241 may also be designed as a trapezoid, an ellipse, or the like.

In this embodiment, a groove depth of each mounting groove 241 along a direction from being close to the first end cover 13 to being away from the first end cover 13 is equal to or greater than a sum of thicknesses of the yoke 22 and the magnet assembly. In this way, a plane of the magnet assembly close to the slide 11 can be flush with a plane of the second end cover 24 close to the first end cover 13, or the plane of the magnet assembly close to the slide 11 can be lower than the plane of the second end cover 24 close to the first end cover 13, thereby reducing an occupied space of the yoke 22 and the magnet assembly, making a structure size of the direct drive motor 100 more compact.

In this embodiment, the coil assembly 12 includes an iron core 121 fixed to a side of the slide 11 close to the base 21 and a plurality of coils 122 respectively wound around the iron core 121.

The iron core 121 includes a flat plate portion 1211 fixed to the side of the slide 11 close to the base 21 and a plurality of extension portions 1212 formed by protruding from a side of the flat plate portion 1211 close to the base 21 toward the base 21 and spaced apart. One of the coils 122 is wound around each of the extension portions 1212.

The iron core 121 is added and the coil 122 is wound around the extension portion 1212 of the iron core 121, so that the coil 122 can be fixed to the slide 11 conveniently, and the plurality of coils 122 are spaced apart from each other to form insulation.

In this embodiment, the primary assembly 1 further includes two first guide rails 14 respectively fixed to two opposite ends of the slide 11. The secondary assembly 2 further includes two second guide rails 25 respectively fixed to two opposite ends of the base 21. The two first guide rails 14 are respectively supported on the two second guide rails 25 and form a slidable connection.

Two opposite circumferential sides of each of the first guide rails 14 form fixed connections with the two first end covers 13 respectively.

Each of the second guide rails 25 includes a first sliding block 251 and a second sliding block 252 fixed apart to the side of the base 21 close to the slide 11. The first guide rail 14 is supported on the corresponding second sliding block 252 and the corresponding first sliding block 251 and forms the slidable connection.

The two first guide rails 14 are arranged on the slide 11, and the two second guide rails 25 are arranged on the base 21, so that the base 21 can be slidably supported on the slide 11 stably.

In addition, in this embodiment, the direct drive motor 100 further includes a first position feedback unit and a second position feedback unit arranged oppositely and apart. One of the first position feedback unit and the second position feedback unit is fixed to a side of the slide 11 close to the base 21, and the other is fixed to the side of the base 21 close to the slide 11. The second position feedback unit is configured to read position information of the first position feedback unit.

The first position feedback unit is a linear encoder 15 fixed to the side of the base 11 close to the slide 21. The second position feedback unit is a linear encoder read head 26 fixed to the side of the slide 21 close to the base 11.

Through the arrangement of the first position feedback unit and the second position feedback unit, it is convenient to read the position information of the primary assembly 1 or the secondary assembly 2 after movement.

In this embodiment, an operating principle of the direct drive motor 100 is as follows. An air gap magnetic field is generated between the coil 122 and the magnet 23. The magnet 23 can sense a magnetic field. When a current is applied to the coil 122, the coil 122 may generate a traveling wave magnetic field, so that thrust is generated between the coil 122 and the magnet 23 to drive one of the primary assembly 1 and the secondary assembly 2 to perform linear motion while the other is fixed.

In addition, when the primary assembly 1 or the secondary assembly 2 moves, position information of the linear encoder 15 may also be read through the linear encoder read head 26, so as to obtain the position information of the primary assembly 1 or the secondary assembly 2 after movement.

Compared with the related art, in the direct drive motor 100 of the disclosure, a side of the second end cover 24 close to the yoke 22 is provided with a mounting groove 241 recessed in a direction away from the yoke 22, and two opposite ends of the yoke 22 are respectively inserted and fixed in the mounting grooves 241 of the two second end covers 24. In this way, a distance between the two second end covers 24 can be closer when the yoke 22 is of a same size, so that the direct drive motor 100 has a more compact structure size and can meet application scenarios with a limited space.

The above descriptions are only embodiments of the disclosure. It should be pointed out herein that, for those of ordinary skill in the art, improvements can also be made without departing from the creative concept of the disclosure, all of which fall within the protection scope of the disclosure.

What is claimed is:

1. A direct drive motor, comprising:
   a primary assembly comprising a slide, a coil assembly fixed to the slide, and two first end covers respectively fixed to two opposite circumferential sides of the slide; and
   a secondary assembly comprising a base arranged opposite to the slide, a yoke fixed to a side of the base close to the slide, a magnet assembly fixed to a side of the yoke close to the slide, and two second end covers respectively fixed to two opposite circumferential sides of the base, wherein the slide is slidably supported on the base; the magnet assembly is arranged opposite to and apart from the coil assembly to interact to generate a driving force, and the two second end covers are respectively arranged opposite to and apart from the two first end covers,
   wherein a side of each of the second end covers close to the yoke is provided with a mounting groove recessed in a direction away from the yoke, and two opposite ends of the yoke are respectively inserted and fixed in mounting grooves of the two second end covers.

2. The direct drive motor as described in claim 1, wherein an orthographic projection of each of the mounting grooves to a corresponding first end cover is at least partially located on the first end cover; and an orthographic projection of the magnet assembly onto the primary assembly is at least partially within a range of the first end cover.

3. The direct drive motor as described in claim 2, wherein each of the mounting grooves has a rectangular structure.

4. The direct drive motor as described in claim 2, wherein a groove depth of each of the mounting grooves along a direction from being close to the first end cover to being away from the first end cover is equal to or greater than a sum of thicknesses of the yoke and the magnet assembly.

5. The direct drive motor as described in claim 1, wherein the coil assembly comprises an iron core fixed to a side of the slide close to the base and coils respectively wound around the iron core.

6. The direct drive motor as described in claim 5, wherein the iron core comprises a flat plate portion fixed to the side of the slide close to the base, and the iron core further comprises extension portions formed by protruding from a side of the flat plate portion close to the base toward the base, the extension portions being spaced apart from one another; and one of the coils is wound around each of the extension portions.

7. The direct drive motor as described in claim 1,
   wherein the primary assembly further comprises two first guide rails respectively fixed to two opposite ends of the slide; and the secondary assembly further comprises two second guide rails respectively fixed to two opposite ends of the base; and
   wherein the two first guide rails are respectively supported on the two second guide rails to form a slidable connection.

8. The direct drive motor as described in claim 7,
   wherein two opposite circumferential sides of each of the first guide rails form fixed connections with the two first end covers, respectively;
   each of the second guide rails comprises a first sliding block and a second sliding block that are spaced apart from each other and fixed to the side of the base close to the slide; and
   the first guide rail is supported on a corresponding second sliding block and a corresponding first sliding block to form the slidable connection.

9. The direct drive motor as described in claim 1,
   wherein the direct drive motor further comprises a first position feedback unit and a second position feedback unit arranged opposite to and spaced apart from each other;
   one of the first position feedback unit and the second position feedback unit is fixed to a side of the slide close to the base, the other one of the first position feedback unit and the second position feedback unit is fixed to the side of the base close to the slide, and
   the second position feedback unit is configured to read position information of the first position feedback unit.

10. The direct drive motor as described in claim 9, wherein the first position feedback unit is a linear encoder fixed to the side of the slide close to the base; and the second position feedback unit is a linear encoder read head fixed to the side of the base close to the slide.

* * * * *